United States Patent
Lindoff et al.

(10) Patent No.: US 9,391,823 B2
(45) Date of Patent: Jul. 12, 2016

(54) METHODS AND RECEIVER FOR POSITIONING OF CLOCK RELATED SPURIOUS SIGNALS

(75) Inventors: Bengt Lindoff, Bjärred (SE); Lars Sundström, Södra Sandby (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/993,869

(22) PCT Filed: Dec. 8, 2011

(86) PCT No.: PCT/EP2011/072230
§ 371 (c)(1),
(2), (4) Date: Jun. 13, 2013

(87) PCT Pub. No.: WO2012/084537
PCT Pub. Date: Jun. 28, 2012

(65) Prior Publication Data
US 2013/0266093 A1    Oct. 10, 2013

(30) Foreign Application Priority Data

Dec. 22, 2010  (EP) .................................... 10196540

(51) Int. Cl.
*H04K 1/10*       (2006.01)
*H04L 27/26*     (2006.01)
(Continued)

(52) U.S. Cl.
CPC ............. *H04L 27/2649* (2013.01); *H04B 15/06* (2013.01); *H04L 27/2657* (2013.01); *H04L 2027/0016* (2013.01); *H04L 2027/0032* (2013.01); *H04L 2027/0065* (2013.01)

(58) Field of Classification Search
CPC . H04B 15/06; H04L 27/2657; H04L 27/2649
USPC ................................. 375/260, 340, 316, 354
See application file for complete search history.

(56) References Cited

U.S. PATENT DOCUMENTS 4,551,856 A * 11/1985  Victor et al. ................ 455/183.2
4,879,758 A * 11/1989  DeLuca et al. ................ 455/296
(Continued)

FOREIGN PATENT DOCUMENTS

DE       102007023388 A1    1/2008
EP             2202899 A1   12/2008
(Continued)

*Primary Examiner* — Helene Tayong
(74) *Attorney, Agent, or Firm* — Coats & Bennett, PLLC (57) ABSTRACT

Methods and a receiver of positioning a spurious signal for reducing the impact of the spurious signal on a received Orthogonal Frequency Division Multiplexing, OFDM signal, are presented. The method comprises determining the frequency of a spurious signal (steps 102, 204, 404), determining the frequency for the respective sub-carrier of the OFDM signal and the difference between the frequency of a sub-carrier and the frequency of a spurious signal (steps 104, 206, 406), and adjusting at least one of: the frequency of the first oscillator (step 208) and a parameter related to the frequency of a second oscillator, to decrease the frequency difference between a sub-carrier and a spurious signal (steps 106, 212, 408). By positioning a spurious signal at or near a sub-carrier frequency, the performance impact of the spurious signal is reduced, and the receiver performance improved.

24 Claims, 5 Drawing Sheets

(51) Int. Cl.
*H04B 15/06* (2006.01)
*H04L 27/00* (2006.01)

(56) References Cited

U.S. PATENT DOCUMENTS

| | | | |
|---|---|---|---|
| 5,745,848 A * | 4/1998 | Robin | 455/296 |
| 6,028,900 A * | 2/2000 | Taura et al. | 375/344 |
| 6,151,369 A * | 11/2000 | Ohkubo et al. | 375/332 |
| 6,545,728 B1 * | 4/2003 | Patel et al. | 348/725 |
| 6,704,374 B1 * | 3/2004 | Belotserkovsky et al. | 375/326 |
| 6,785,527 B2 * | 8/2004 | Earls | 455/323 |
| 6,922,451 B1 * | 7/2005 | Ichihara | 375/334 |
| 7,646,704 B2 | 1/2010 | Yu et al. | |
| 7,761,057 B2 | 7/2010 | Sreerama et al. | |
| 7,804,920 B2 | 9/2010 | Deisher et al. | |
| 7,940,830 B2 * | 5/2011 | Marsili et al. | 375/134 |
| 8,254,855 B2 * | 8/2012 | Filipovic et al. | 455/114.2 |
| 8,270,535 B2 * | 9/2012 | Iizuka | 375/316 |
| 8,451,918 B1 * | 5/2013 | Cheng et al. | 375/260 |
| 8,761,709 B2 * | 6/2014 | Leinonen et al. | 455/307 |
| 2005/0260961 A1 * | 11/2005 | Cowley et al. | 455/191.1 |
| 2007/0153878 A1 * | 7/2007 | Filipovic | 375/147 |
| 2009/0072912 A1 * | 3/2009 | Kim et al. | 331/16 |
| 2009/0138745 A1 | 5/2009 | Dorsey et al. | |
| 2009/0232246 A1 * | 9/2009 | Iida | 375/267 |
| 2009/0258628 A1 * | 10/2009 | Lindoff et al. | 455/302 |
| 2009/0274228 A1 * | 11/2009 | Nakayama | 375/260 |
| 2010/0177850 A1 * | 7/2010 | Iizuka | 375/316 |
| 2011/0217918 A1 * | 9/2011 | Rechberger et al. | 455/1 |

FOREIGN PATENT DOCUMENTS

| | | |
|---|---|---|
| WO | 03090422 A1 | 10/2003 |
| WO | 2007099413 A1 | 9/2007 |
| WO | 2009093156 A1 | 7/2009 |

* cited by examiner

FIG. 5

METHODS AND RECEIVER FOR POSITIONING OF CLOCK RELATED SPURIOUS SIGNALS

TECHNICAL FIELD

This invention pertains in general to the field of suppression of clock spurious signals. More particularly the invention relates to methods and a receiver for positioning of clock spurious signals for decreasing the negative effect of said spurious signals on an Orthogonal Frequency Division Multiplexing (OFDM) signal received by a receiver.

BACKGROUND

Interference in a mobile terminal can be created by internal components or units. The smaller the mobile terminal or a transceiver unit is, the larger is the risk for internally generated interference. One typical example of internally generated interference is the interference caused by a clock signal leaking into the Radio Frequency (RF) parts of the transceiver unit. The harmonics of the clock signal extend into the RF domain and might therefore interfere with the received signal. This is especially a problem at low power levels of the received signal.

Sensitivity is a key parameter for receivers due to the fact that the sensitivity level is related to the coverage for a mobile terminal. Hence, from an operator point of view, there is a selling argument for mobile terminals or modems having a good sensitivity.

The problem with spurious signals in the receiver band, originated from a baseband clock signal, to mention one example, is typically mitigated by proper layout design of different blocks in the baseband and in the radio chip as well as on higher level routing of these blocks. However, based on practical experience such signal leakage can hardly be completely removed by layout design only. There can hence remain some residual leakage causing interference.

One solution of this problem according to prior art is to introduce a narrow-band notch filter in the time domain for filtering out the spurious signal. Since the clock frequency and the frequency of potential harmonics are known, narrow-band or notch filters might be introduced into the receiver chain.

This solution, however, has a drawback in that it requires a sampling rate in the order of 10 MHz of the received signal in combination with the need for a plurality of filter taps for establishing a sufficiently narrow notch filter, since the leakage signal is typically only about 100-1000 Hz wide. Such a filter is typically very expensive in terms of size, cost, and power or current consumption.

Therefore, there is a need for methods and arrangements improving the receiver performance close to the reference sensitivity level in the case of having harmonics from the baseband clock leaking into the receiver chain that do not require costly notch filters that consume considerable power.

SUMMARY

The present invention seeks to mitigate, alleviate or eliminate one or more of the above-identified deficiencies in the prior art and disadvantages singly or in any combination and solves at least the above mentioned problem by providing a method and an arrangement according to the appended patent claims.

The general solution is to position the clock harmonics spurious signal relative to sub-carriers of a received OFDM signal, such that the negative effect of the spurious signal is reduced.

According to one aspect of the present invention, a method in a receiver of positioning a spurious signal for reducing the impact of the spurious signal on a received OFDM signal by down-converting said OFDM signal to baseband, is disclosed. The method comprises determining the frequency of a spurious signal based on a frequency of a first oscillator. The frequency for the respective sub-carrier of the OFDM signal and the difference between the frequency of a sub-carrier and the frequency of a spurious signal are also determined. Moreover, at least one of: the frequency of the first oscillator and a parameter related to the frequency of a second oscillator are adjusted, to decrease the frequency difference between a sub-carrier and a spurious signal.

The parameter related to the frequency of the second oscillator of the method, may further comprise a control parameter for the frequency of the second oscillator.

The step of adjusting the control parameter for the frequency of the second oscillator, according to the method, may be performed such that the frequency of the second oscillator equals the carrier frequency of the OFDM signal plus the determined difference between the frequency of the spurious signal and the frequency of the sub-carrier.

The method may further comprise applying a digital de-rotator to shift the OFDM signal with a frequency amount corresponding to the difference between the frequency of the spurious signal and the frequency of a sub-carrier.

The method may further comprise removing a Direct Current, DC component from a base band signal, prior to setting the frequency of the digital de-rotator.

Adjusting the frequency of the first oscillator, according to the method, may be performed prior to determining the frequency of the spurious signal.

Adjusting the control parameter related to the frequency of a second oscillator, according to the method, may be performed such that the frequency of the second oscillator is equal to the carrier frequency of the OFDM signal.

The method may further comprise suppression of a spurious signal by setting soft values of the sub-carriers affected by any one of previous steps to zero, or by estimation of a spurious signal and subtraction of said spurious signal.

The sub-carrier in the step of adjusting the control parameter, within the method, may comprise the sub-carrier closest to the spurious signal.

According to a second aspect of the present invention, a receiver for positioning a spurious signal for reducing the impact of the spurious signal on a received OFDM signal by down-converting said OFDM signal to base band, is disclosed. The receiver comprises a down-converting mixer configured to determine the frequency of the spurious signal based on a frequency of a first oscillator, and to determine the frequency for the respective sub-carrier of the OFDM signal and determining the difference between the frequency of a sub-carrier and a spurious signal. The receiver also comprises a controller operatively connected to the down-converting mixer, wherein the controller is configured to adjust at least one of: the frequency of the first oscillator and a parameter related to the frequency of a second oscillator, to decrease the frequency difference between a sub-carrier and a spurious signal.

Embodiments of the present invention come with the following advantages:

With the proposed invention the resulting spurious signal is placed in the vicinity of, or directly on a sub-carrier frequency which reduces the negative performance impact of the spurious signal, and thereby improves the sensitivity of the receiver.

BRIEF DESCRIPTION OF DRAWINGS

These and other aspects, features and advantages of which the invention is capable of will be apparent and elucidated from the following description of embodiments of the present invention, reference being made to the accompanying drawings, in which FIGS. 1, 2 and 4 schematically illustrate a signal flow diagram related to embodiments of the present invention.

ABBREVIATIONS

DC Direct Current
FFT Fast Fourier Transform
LO Local Oscillator
OFDM Orthogonal Frequency Division Multiplexing
PLL Phase-Locked Loop
XO Crystal Oscillator or X-tal Oscillator

DETAILED DESCRIPTION

Within the present invention, a mobile terminal or a receiver utilizes the knowledge of the frequency of potential signals that may leak in to the pass-band of a received signal. The potential signals are often harmonics of internal clock signals.

A basic idea of the embodiments of the present invention is to adapt an internally generated carrier frequency such that a spurious signal is positioned at, or at least near, a sub-carrier frequency. The present invention comprises a few embodiments of which two will be briefly sketched already at this stage.

Within a first embodiment, adaptation of the frequency of both the internally generated clock signal as well a parameter in the Phase Locked Loop, PLL transforming the frequency of a clock signal to a Local Oscillator, LO carrier frequency, is performed. In this embodiment, the spurious signal originating from the clock signal is translated to a frequency corresponding to a sub-carrier frequency.

Within a second embodiment of the present invention, adaptation is performed of either an internally generated clock signal or the LO carrier frequency by at maximum half the sub-carrier spacing at radio frequency and a digital frequency compensator that is introduced to compensate for a LO offset.

Within the two mentioned embodiments suppression of spurious signals is performed in a subsequent base band processing, for instance, by either setting soft values on the affected sub-carrier to zero (so called nulling), or by estimation and subsequent subtraction of spurious signals. It shall be mentioned that suppression is not limited by the two mentioned methods. Rather other methods may just as well be applied.

It can also be mentioned that a signal having a frequency F is distributed over different frequency bins, when transformed by a Fast Fourier Transform, FFT of a certain dimension. The closer F is to a certain carrier frequency, the fewer sub-carriers are affected.

Thus, performance degradation is much smaller when the frequency of a spurious signal is close to a sub-carrier frequency, as compared with the case where the frequency of the spurious signal is approximately in the middle of two adjacent sub-carriers.

Hence, the idea of the embodiments of the present invention is to utilize the knowledge of the spurious frequency and to position the spurious signal accordingly, to only affect one, or a small number of, sub-carrier(s).

Embodiments of the present invention will now be described.

Figure 1:
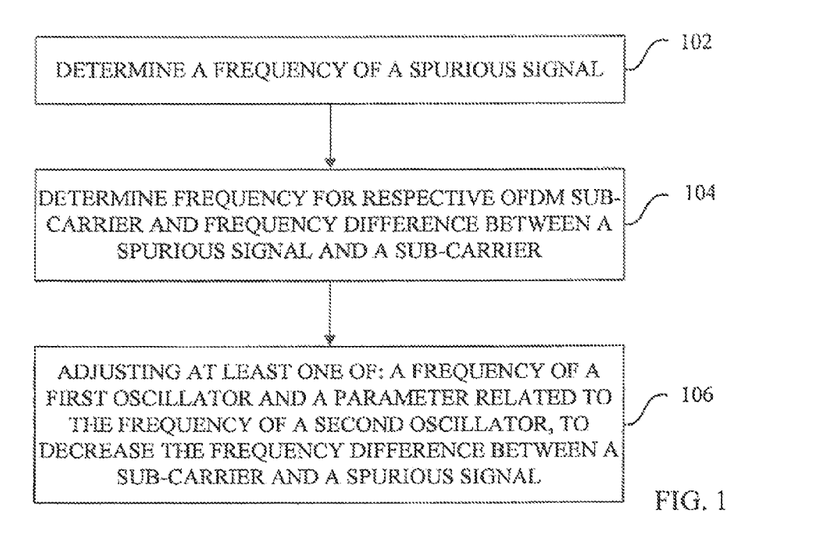

FIG. 1 illustrates a signal flow diagram related to a general embodiment of the present invention.

According to one embodiment, a receiver or a mobile terminal determines the frequency of a spurious signal in step 102. This determination is based on the frequency of a first oscillator. The mobile terminal or receiver then determines the frequency of the respective OFDM sub-carrier and the frequency difference between a sub-carrier and a spurious signal, in step 104. Thereafter, a parameter is adjusted to decrease the frequency difference between a spurious signal and a sub-carrier in step 106.

Figure 2:
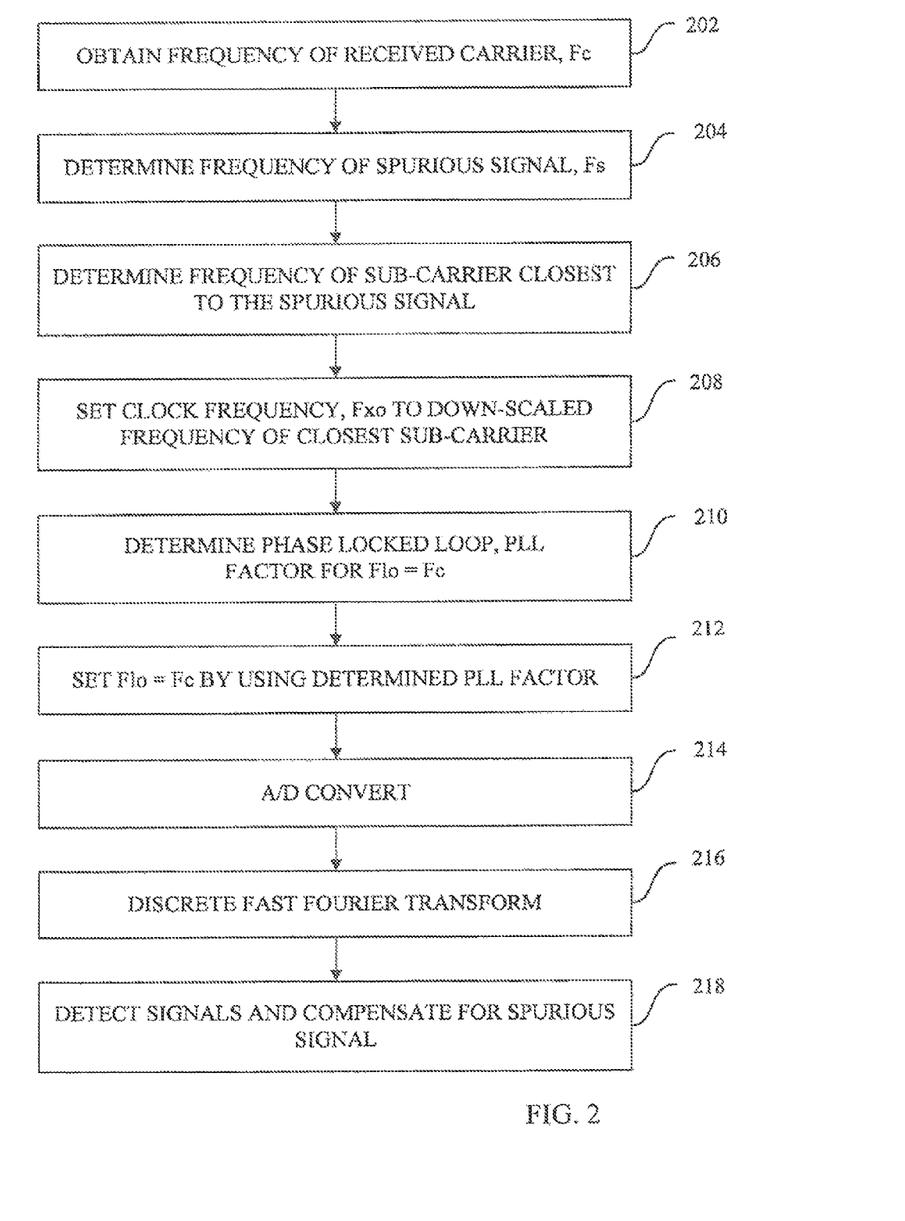
Figure 3:
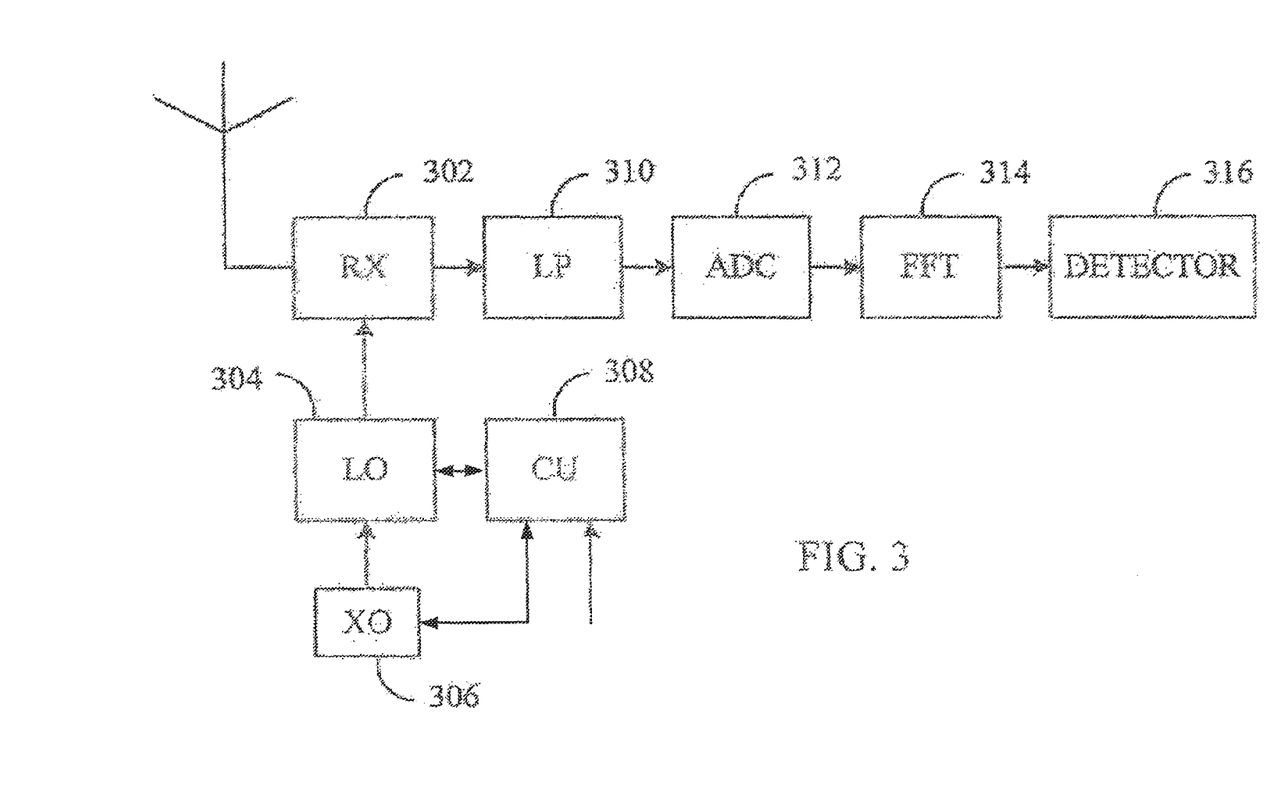
FIGS. 3 and 5 schematically present block diagrams related to embodiments of the present invention.

FIG. 2 illustrates a flow chart of method steps according to one embodiment of the invention. Reference will also be made to FIG. 3 presenting a block diagram related to said embodiment of the present invention.

According to this embodiment, reducing the impact of the spurious signal on a received OFDM signal comprises obtaining the carrier frequency Fc of the OFDM signal, in step 202. Thereafter, the frequency of the relevant spurious signal is determined, in step 204. The relevant spurious signals are those which might interfere with the received OFDM signal. This determination is based on settings of a crystal oscillator, XO. The spurious signal is typically a harmonic of the frequency of the crystal oscillator, Fxo. Then, the frequency of a sub-carrier that is closest to a spurious signal, is determined in step 206.

In the subsequent step, step 208, the clock frequency Fxo is set to the down-scaled frequency of the closest sub-carrier. Having performed that, it is determined a Phase Locked Loop, PLL parameter or factor with which a frequency of a local oscillator Flo equals the frequency of the carrier Fc, in step 210. In the subsequent step of 212, the determined PLL factor from step 210 is now used whereby Flo is set to Fc.

In other words, an offset for the frequency Fxo of the XO and the PLL factor or parameter are determined. The PLL transforms the Fxo frequency up to the carrier frequency Fc. The offset is determined such that the frequency of the LO, Flo, matches the carrier frequency, Fc. Having determined the offset and the PLL parameter, the Fxo and the PLL parameter or factor are then retuned.

The adaptation of Fxo and the PLL factor to achieve that Flo equals to Fc, can be made for all signal levels. It may alternatively be made based on the received signal level, or more precisely at low signal levels, since the problem with interfering spurious signals mainly exists at low signal levels close to the reference sensitivity level, approximately below −90 dBm.

Having set both the frequency of the local oscillator by using the PLL factor, the received OFDM signal is then digitalized by an Analog to Digital Converter, ADC converting the analog OFDM signal, in step 214. Having a digital signal, a Fast Fourier Transform, FFT is applied in step 216.

In step 218, the resulting signal is detected and compensating means for suppression of the spurious signal is applied. Examples of such base band processing are setting the soft values on the affected sub-carriers to zero, or estimation and subsequent subtraction of the spurious signals. It must be emphasized that suppression is not limited by the two mentioned examples. Rather, other methods may just as well be applied.

FIG. 3 presents a block diagram related to the embodiment of FIG. 2 of the present invention. It is implicitly illustrated that the OFDM signal is received by a front-end transceiving unit RX 302 including a down-converting mixer. The frequency Flo of a Local Oscillator, LO 304 is based on the frequency Fxo of the Crystal Oscillator, 306. A Control Unit, CU 308 controls the LO frequency Flo, using a Phase Locked Loop, PLL.

The down-converted OFDM signal is Low-Pass filtered in 310, obtaining a base-band of the OFDM signal. The signal is thereafter digitalized by an Analog to Digital Converter, ADC, after which the digital signal is subjected to a Fast Fourier Transform, FFT 314. In a detector 316 the spurious signal is then suppressed by processing of the FFT signal.

The front-end transceiving unit 302 supplies a baseband signal of the OFDM signal to the detector 316 that demodulates the received signal.

Based on the current received carrier frequency of the OFDM signal, the potential spurious frequency that might interfere with the received signal is determined. As mentioned above this derivation is based on the current settings of the X-tal Oscillator, XO. The spurious signal is typically a harmonic of the XO frequency Fxo. Once the frequency of the spurious signal is determined, the frequency difference between the spurious signal and the closest sub-carrier may be determined, which difference is less than or equal to the sub-carrier spacing.

According to an alternative embodiment, it is determined that translating the spurious signal to an adjacent sub-carrier might have a large effect on the performance in case this sub-carrier contains specifically important information and therefore the spurious signal is instead translated slightly further in frequency. For example, sub-carriers assigned for reference signals or pilots could be avoided not to interfere with channel estimation etc. For this reason, the spurious signal may accordingly be translated to a neighboring, but not adjacent, sub-carrier frequency.

In the following an example is presented showing how to set the frequency of the LO and the XO, as well as how to set the PLL factor or parameter.

Assume that the XO has a frequency Fxo 26.001 MHz, and the carrier frequency used is 2600 MHz, with a system bandwidth 5 MHz. It is noted that the division ratio in the PLL is 99.996154, which is 2600 divided by 26.001 MHz.

Further, the $100^{th}$ harmonics of the Fxo is then @ f=2600.1 MHz, which is within the system bandwidth, BW, of 2597.5 MHz to 2602.5 MHz. The sub-carrier closest to the spurious signal is @ f=2600.105 MHz, being 2600.100 MHz+N×15 kHz, where N=7. The closest sub-carrier is thus 5 kHz away from the spurious signal. By setting the Fxo to the down-scaled frequency of the closest sub-carrier 26.00105 MHz and the PLL parameter or division ratio to 99.9959617, being 2600 divided by 26.00105, the carrier frequency is kept @ 2600 MHz and the spurious signal is @ a sub-carrier frequency, namely 2600.105 MHz.

By achieving such a close matching, only one sub-carrier will be affected by the spurious signal, so that the impact can be effectively mitigated by simple coding.

Some receiver architectures do not allow adaptation of Fxo frequency of the XO. For such cases, an alternative embodiment of the present invention is presented.

Figure 4:
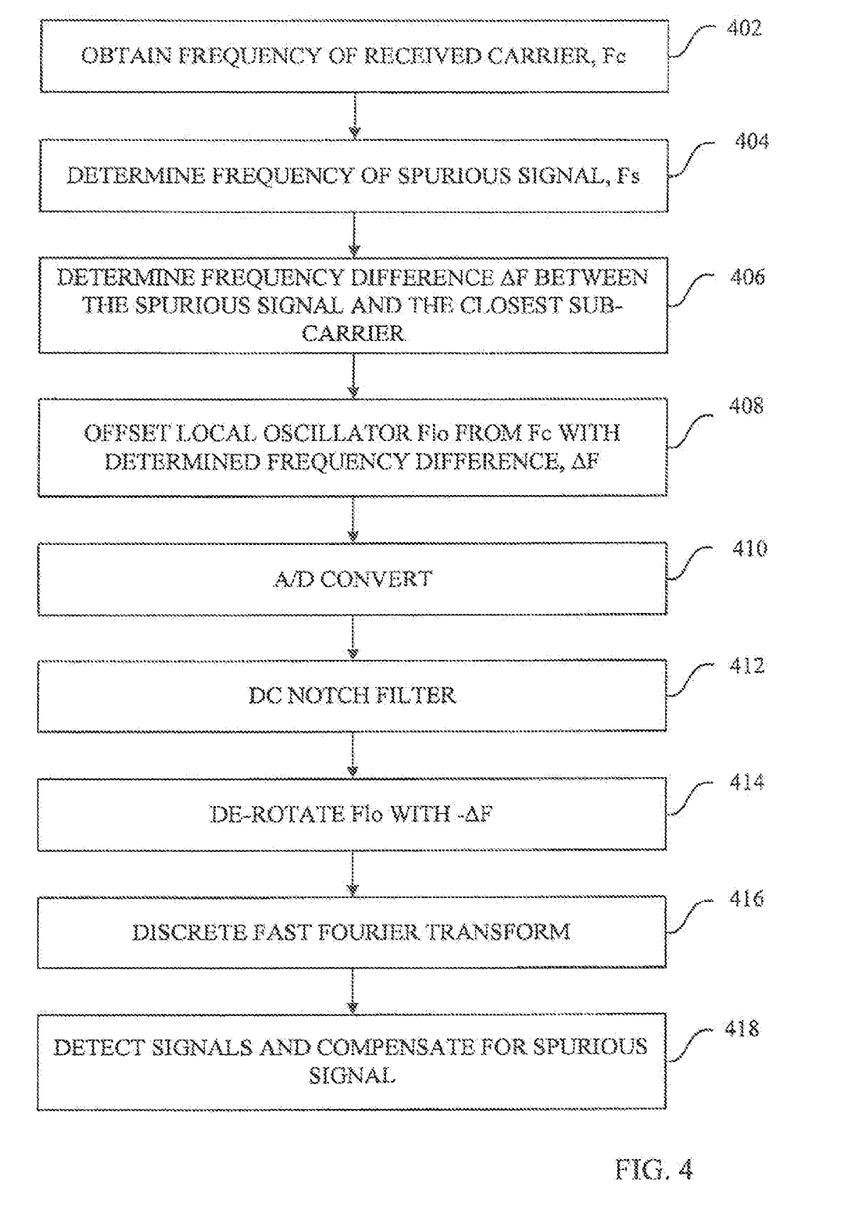

For this reason FIG. 4 presents a flow chart of method steps of another method for reducing the impact of spurious signal on a received OFDM signal.

The first two steps in FIG. 4 are the same as those presented in FIG. 2, for a different embodiment of the present invention. It is nevertheless briefly mentioned that step 402 comprises obtaining the carrier frequency of the received OFDM frequency, and that step 404 comprises determining the frequency of a spurious signal, Fs.

In step 406 the frequency difference $\Delta F$ between the spurious signal and the closest sub-carrier is determined. In step 408, the frequency Flo of the Local Oscillator, LO, is offset from the frequency of the carrier Fc by the determined frequency difference $\Delta F$. This step may involve adjusting a PLL parameter to achieve that Flo=Fc+$\Delta F$.

Thereafter, step 410 comprises digitalizing the down-converted OFDM signal by performing an Analog to Digital Conversion, ADC. A High-Pass Direct Current, DC notch filter may be passed in step 412, to eliminate any DC content of the resulting received OFDM signal. It can be mentioned that this HP filtering in step 412 can alternatively be performed on the analog signal prior to the ADC in step 410.

It can be mentioned means other than the ones mentioned above, can be used to reducing DC contents of the resulting OFDM signal.

In step 414, the resulting OFDM signal is now digitally rotated back or de-rotated by $\Delta F$, (or digitally rotated with $-\Delta F$). In this step, all frequencies are thus turned to their correct values, after having been offset an amount $\Delta F$ too far in step 408.

Steps 416 and 418 correspond to steps 216 and 218 of FIG. 2, and thus comprise performing discrete Fast Fourier Transform, FFT, and detecting signals and compensating for spurious signals, respectively, as mentioned above.

Figure 5:
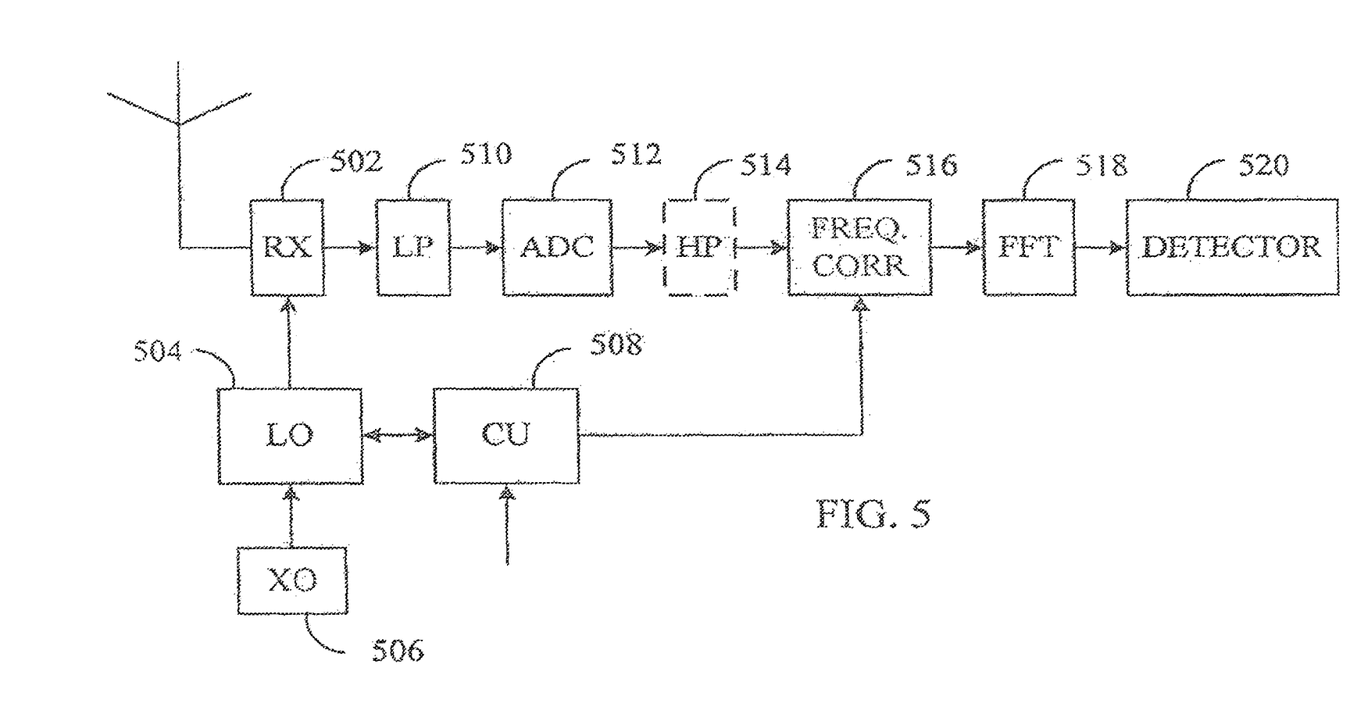

With reference to FIG. 5 presenting a block diagram related to the embodiment of FIG. 4 of the present invention. It is implicitly illustrated that the OFDM signal is received by a front-end transceiving unit RX 502 including a down-converting mixer. The frequency Flo of a Local Oscillator, LO 504 is based on the frequency Fxo of the X-tal Oscillator, XO 506. A Control Unit, CU 508 controls the LO frequency Flo, using a Phase Locked Loop, PLL.

The down-converted OFDM signal is Low-Pass filtered in 510, obtaining a base-band signal of the OFDM signal. The signal is thereafter digitalized by an Analog to Digital Converter, ADC, 512 after which the digital signal may be subjected to High-Pass filter 514. As mentioned above, this filter is also a Direct Current notch filter, removing any DC component of the OFDM signal.

Now, in step 516, all frequencies of the OFDM signal are corrected by an amount corresponding to an earlier determined offset, $\Delta F$, being the difference between the spurious signal and, the closest or a close, sub-carrier. In step 518 FFT is performed and signals are detected in the detector 520, wherein suppression of spurious signals is performed.

Thus, the front-end transceiving unit 502 supplies a baseband signal of the OFDM signal to the detector that demodulates the received signal.

That is, the potential spurious signals or frequencies that might interfere with the current received carrier frequency is determined. This derivation is based on the current settings and frequency Fxo of the crystal oscillator, XO 506. As mentioned above, the spurious signal or frequency is typically a harmonic of the Fxo frequency.

Once the frequency of the spurious frequency is determined, the frequency difference between the spurious signal and a close or the closest sub-carrier is determined. This difference is less than or equal to half the sub-carrier spacing of 15 kHz, in the case of the closest sub-carrier. The Flo frequency is first offset with that frequency difference, after which the offset is digitally compensated by a digital de-rotator, placed after the ADC 512 but prior to the FFT 518. As presented above, an embodiment may also comprise a DC notch filter 514 prior to the digital frequency de-rotator 516.

A DC offset of varying magnitude is generated in the down-converting mixer 502 and in baseband blocks due to imperfections, and in order to not introduce DC leakage in the FFT, a time domain notch filter, removing the DC may be introduced. The DC notch is preferably introduced in the digital domain as illustrated in FIG. 5, but may alternatively be introduced as an analog filter prior to the ADC 512.

As an alternative to positioning the spurious signal at the nearest sub-carrier frequency, it may instead be positioned only at nearby sub-carriers allocated for a specific need such that the impact of the spurious signal will have the least impact. For example, sub-carriers assigned for reference signals or pilots could be avoided not to interfere with channel estimation etc. Hence embodiments of the invention also comprise the concept of translating the spurious signals to a neighboring, but not an adjacent, sub-carrier.

According to an alternative embodiment of the present invention, adjusting of the frequency may be performed by the first oscillator, as well as of a parameter related to the frequency of a second oscillator, to decrease the frequency difference between a sub-carrier and a spurious signal.

Figure 6:
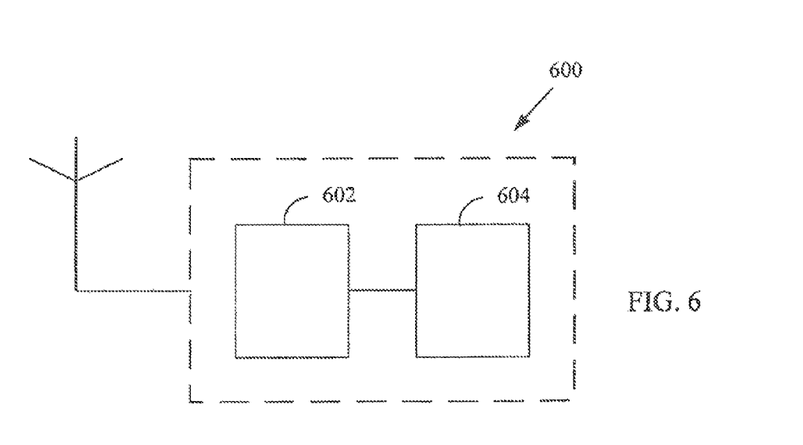
FIG. 6 schematically illustrates a block diagram of an arrangement according to the present invention.

FIG. 6 schematically presents an arrangement of positioning a spurious signal for reducing the impact of the spurious signal on a received OFDM signal by down-converting said OFDM signal to a base band. The arrangement 600 comprises a down-converting mixer 602 that is configured to determine the frequency of the spurious signal based on a frequency of a first oscillator. The down-converting mixer is further configured to determine the frequency for the respective sub-carrier of the OFDM signal and determine the difference between the frequency of a sub-carrier and a spurious signal. The arrangement 600 also comprises a controller 604 that is operatively connected to the down-converting mixer 602, wherein the controller is configured to adjust at least one of: the frequency of the first oscillator and a parameter related to the frequency of a second oscillator, to decrease the frequency difference between a sub-carrier and a spurious signal.

It must be emphasized that the present invention can be varied in many ways.

The presented embodiments of the present invention are only a few examples of the variety of embodiments that are comprised within the present invention.

The embodiments of the present invention provide at least the following advantages:

With the proposed invention the resulting spurious frequency is positioned at least close a sub-carrier frequency which reduces the performance impact of the spurious signal, and thereby improves the receiver performance.

Although the present invention has been described above with reference to specific embodiments, it is not intended to be limited to the specific form set forth herein. Rather, the invention is limited only by the accompanying claims and other embodiments than the specific above are equally possible within the scope of these appended claims.

It is made clear that presented embodiments may well be combined forming new embodiments not explicitly described herein.

In the claims, the term "comprises/comprising" does not exclude the presence of other elements or steps. Furthermore, although individually listed, a plurality of means, or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method in a mobile terminal of positioning a spurious signal for reducing an impact of the spurious signal on a received Orthogonal Frequency Division Multiplexing (OFDM) signal, the method comprising:
   determining, by controller circuitry operationally coupled to a first oscillator, a frequency of the spurious signal, wherein the spurious signal originates from a frequency signal of the first oscillator;
   determining a frequency for a sub-carrier of the OFDM signal;
   determining a frequency difference between the frequency of the sub-carrier and the frequency of the spurious signal;
   adjusting the frequency of the first oscillator to decrease the frequency difference; and
   adjusting, by the controller circuitry that is also operationally coupled to a second oscillator, a parameter related to a frequency of the second oscillator, wherein the parameter includes a control parameter for determining the frequency of the second oscillator.

2. The method of claim 1, wherein adjusting the parameter includes adjusting the parameter so that the frequency of the second oscillator equals a carrier frequency of the OFDM signal.

3. The method of claim 1, wherein adjusting the parameter includes adjusting the frequency of the first oscillator prior to determining the frequency of the spurious signal.

4. The method of claim 3, wherein adjusting the parameter includes adjusting the parameter so that the frequency of the second oscillator is a carrier frequency of the OFDM signal.

5. The method of claim 1, further comprising applying a digital de-rotator to shift a baseband signal associated with the OFDM signal by a frequency amount corresponding to the frequency difference.

6. The method of claim 5, further comprising:
   setting the frequency amount of the digital de-rotator;
   prior to the setting, removing a Direct Current component from the baseband signal.

7. The method of claim 1, further comprising suppressing the spurious signal by at least one of:
   zero-setting soft values of one or more selected sub-carriers; and
   estimating and subtracting the spurious signal.

8. The method of claim 1, wherein the sub-carrier comprises a sub-carrier closest to the spurious signal.

9. The method of claim 1, wherein adjusting the parameter includes adjusting the parameter so that the frequency of the spurious signal is equivalent to the frequency of the sub-carrier of the OFDM signal and the frequency of the second oscillator is equivalent to a carrier frequency of the OFDM signal.

10. The method of claim 1, wherein the parameter includes a control parameter for determining the frequency of the second oscillator.

11. The method of claim 1, wherein adjusting the frequency of the first oscillator adjusts the frequency of the spurious signal.

12. The method of claim 1, wherein the spurious signal is a harmonic of the frequency signal of the first oscillator and the first oscillator is a crystal oscillator (XO).

13. A system for positioning a spurious signal for reducing an impact of the spurious signal on a received Orthogonal Frequency Division Multiplexing (OFDM) signal comprising:
 controller circuitry operationally coupled to a first oscillator and a second oscillator, wherein the controller circuitry is configured to:
  determine a frequency of the spurious signal, wherein the spurious signal originates from a frequency signal of the first oscillator;
  determine a frequency for a subcarrier of the OFDM signal and determine a frequency difference between the frequency of the sub-carrier and the spurious signal;
  adjust the frequency of the first oscillator to decrease the frequency difference; and
  adjust a parameter related to a frequency of the second oscillator, wherein the parameter includes a control parameter for determining the frequency of the second oscillator.

14. The system of claim 13, wherein the controller circuitry is further configured to:
 adjust the parameter so that the frequency of the second oscillator is equivalent to a carrier frequency of the OFDM.

15. The system of claim 13, wherein the controller circuitry is further configured to:
 adjust the frequency of the first oscillator prior to determining the frequency of the spurious signal.

16. The system of claim 15, wherein the controller circuitry is further configured to:
 adjust the parameter so that the frequency of the second oscillator is a carrier frequency of the OFDM signal.

17. The system of claim 13, further comprising:
 a digital frequency de-rotator circuit configured to:
  apply a frequency shift corresponding to the frequency difference to a baseband signal associated with the OFDM signal.

18. The system of claim 17, wherein the digital frequency de-rotator circuit is further configured to:
 remove a direct current (DC) component from the baseband signal; and
 set the frequency amount of the digital de-rotator.

19. The system of claim 13, further comprising:
 a detector circuit configured to:
  perform at least one of zero-setting soft values of one or more selected sub-carriers, and estimating and subtracting the spurious signal.

20. The system of claim 13, wherein the sub-carrier includes a sub-carrier closest to the spurious signal.

21. The system of claim 13, wherein the controller circuitry is further configured to:
 adjust the parameter so that the frequency of the spurious signal is equivalent to the frequency of the sub-carrier of the OFDM signal and the frequency of the second oscillator is equivalent to a carrier frequency of the OFDM signal.

22. The system of claim 13, wherein adjusting the frequency of the first oscillator adjusts the frequency of the spurious signal.

23. A method in a mobile terminal of positioning a spurious signal for reducing an impact of the spurious signal on a received Orthogonal Frequency Division Multiplexing (OFDM) signal, the method comprising:
 determining, by controller circuitry operationally coupled to a first oscillator, a frequency of the spurious signal, wherein the spurious signal originates from a frequency signal of the first oscillator;
 determining a frequency for a sub-carrier of the OFDM signal;
 determining a frequency difference between the frequency of the sub-carrier and the frequency of the spurious signal;
 adjusting the frequency of the first oscillator to decrease the frequency difference; and
 adjusting, by the controller circuitry that is also operationally coupled to a second oscillator, a parameter related to a frequency of the second oscillator so that the frequency of the second oscillator equals a carrier frequency of the OFDM signal.

24. A system for positioning a spurious signal for reducing an impact of the spurious signal on a received Orthogonal Frequency Division Multiplexing (OFDM) signal comprising:
 controller circuitry operationally coupled to a first oscillator and a second oscillator, wherein the controller circuitry is configured to:
  determine a frequency of the spurious signal, wherein the spurious signal originates from a frequency signal of the first oscillator;
  determine a frequency for a subcarrier of the OFDM signal and determine a frequency difference between the frequency of the sub-carrier and the spurious signal;
  adjust the frequency of the first oscillator to decrease the frequency difference; and
  adjust a parameter related to a frequency of the second oscillator so that the frequency of the second oscillator equals a carrier frequency of the OFDM signal.

\* \* \* \* \*